United States Patent [19]
Berman et al.

[11] Patent Number: 4,987,410
[45] Date of Patent: Jan. 22, 1991

[54] MULTIPLE IMAGE FORMING APPARATUS

[75] Inventors: Arthur L. Berman, San Jose; Thomas M. Lewis, Santa Cruz, both of Calif.

[73] Assignee: Kaiser Aerospace & Electronics Corporation, Oakland, Calif.

[21] Appl. No.: 455,896

[22] Filed: Dec. 18, 1989

Related U.S. Application Data

[63] Continuation of Ser. No. 147,834, Jan. 25, 1988, abandoned.

[51] Int. Cl.[5] .............................................. G09G 1/00
[52] U.S. Cl. ................................... 340/705; 340/795; 340/702; 350/174
[58] Field of Search .............. 340/705, 716, 717, 702, 340/795, 784, 980, 794; 350/33 D, 331 R, 335, 337, 350 S, 347 R, 347 E, 347 V, 388, 391, 169, 171, 172, 174; 353/28, 30, 31, 34; 358/61, 232, 250, 253

[56] References Cited

U.S. PATENT DOCUMENTS 4,688,901 8/1987 Albert .............................. 350/350 S
4,726,663 2/1988 Buzak ................................. 350/337

*Primary Examiner*—Jeffery A. Brier
*Attorney, Agent, or Firm*—Townsend and Townsend

[57] ABSTRACT

A head-up display (HUD)/head-down display (HDD) system capable of projecting multi-color images employs cholesteric liquid crystal elements, two-state liquid crystal devices, an image source, a beam splitter, and a combiner to, in sequence, generate HUD and HDD images. An LCD and cholesteric liquid crystal element operate together to selectively transmit or block portions of an image incident thereon. The switching frequency of the LCD-cholesteric liquid crystal element is above the flicker-fusion frequency, such that both the HUD and HDD displays appear to the observer to be simultaneously and continuously operating.

17 Claims, 4 Drawing Sheets

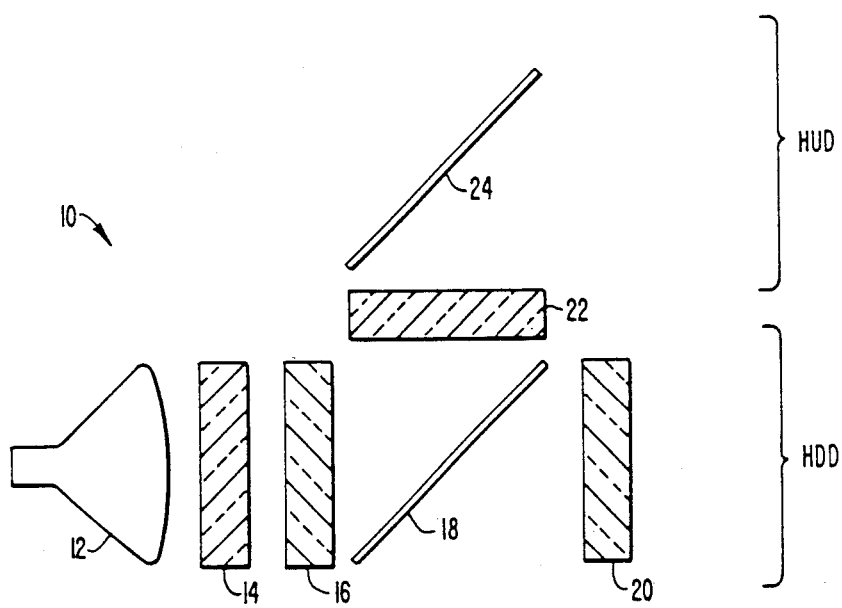
FIG._1a.
PRIOR ART
| LCD 16 | PATH |
|--------|------|
| LOW    | HDD  |
| HIGH   | HUD  |
FIG._1b.
PRIOR ART

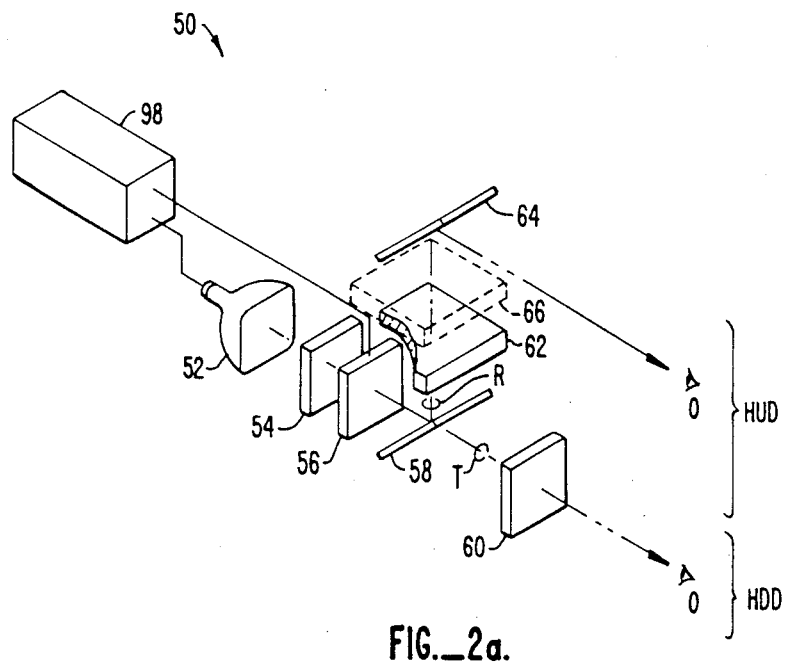
FIG._2a.
| LCD 56 | PATH |
|---|---|
| HIGH | HDD |
| LOW | HUD |
FIG._2b.

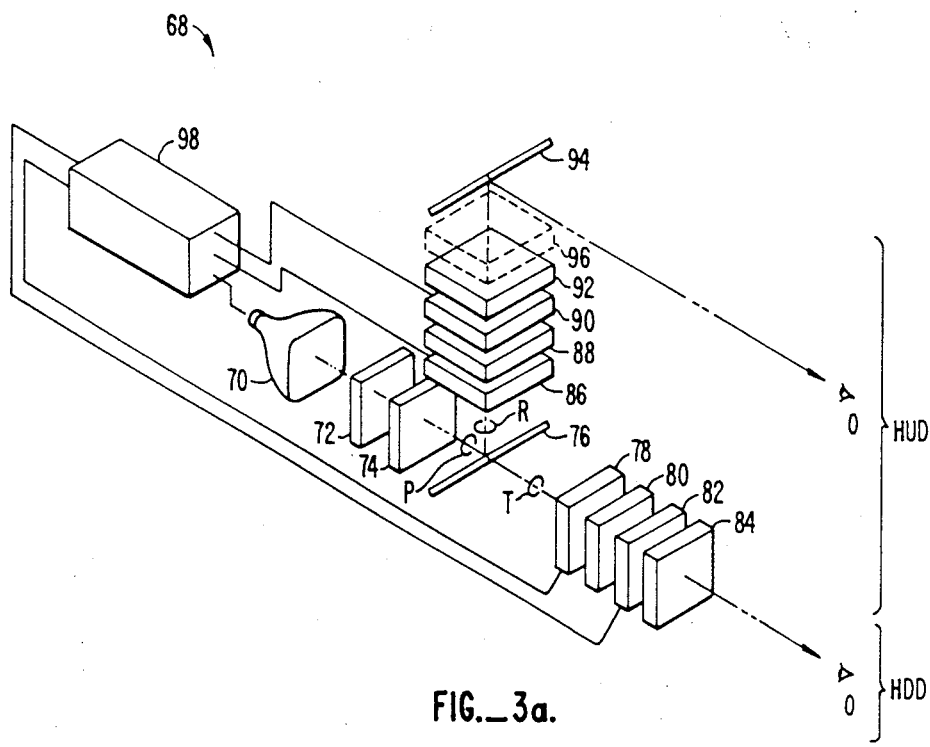
FIG._3a.
| LCD 78 | LCD 82 | LCD 86 | LCD 90 | PATH | |
|---|---|---|---|---|---|
| | | | | RED | GREEN |
| HIGH | LOW | HIGH | HIGH | HDD | — |
| LOW | LOW | HIGH | HIGH | — | HDD |
| LOW | HIGH | LOW | HIGH | HUD | — |
| LOW | HIGH | HIGH | LOW | — | HUD |
FIG._3b.

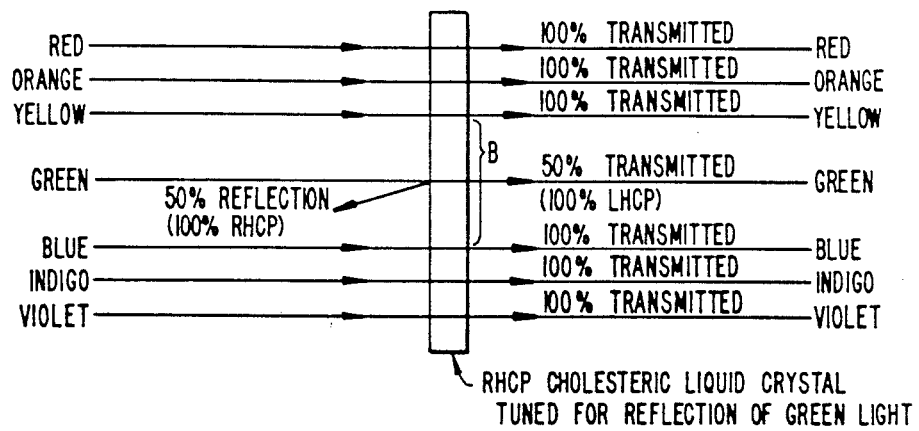
FIG._4a.
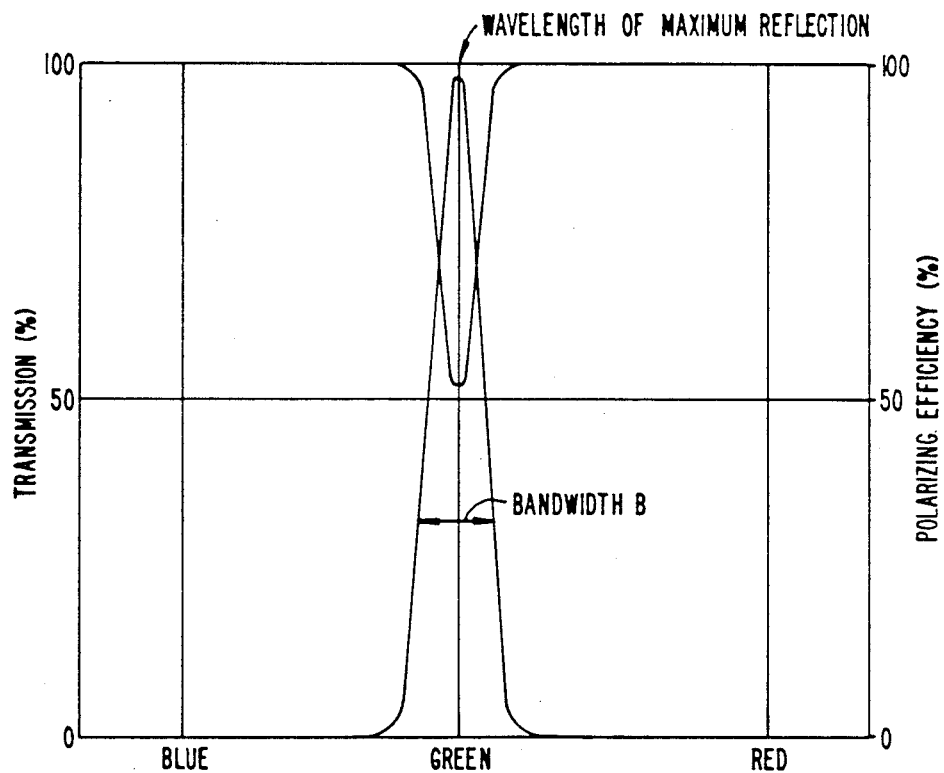
FIG._4b.

MULTIPLE IMAGE FORMING APPARATUS

This is a continuation of application Ser. No. 07/147,834, filed Jan. 25, 1988, now abandoned.

BACKGROUND OF THE INVENTION

The present invention relates generally to the field of display systems for use in aircraft, land vehicles, and the like, and more particularly to a head-up/head-down display instrument utilizing cholesteric liquid crystal elements.

Many of todays more advanced aircraft, as well as many other advanced vehicles include a cathode ray tube-based head-up display ("HUD") and head-down display ("HDD") as cockpit instruments. Until recently, these were necessarily two separate units. There are now systems that combine the HUD and HDD in a single unit by using a single cathode ray tube ("CRT") that alternatively displays HUD and HDD symbology. When the CRT displays the HUD image, the optical system directs the image to the HUD screen and blocks it from the HDD screen. When the CRT displays the HDD image, the optical system directs the image to the HDD screen and blocks it from the HUD screen. The system switches back and forth between HUD and HDD images so quickly that the pilot or operator perceives both displays to be on simultaneously and continuously.

With reference to FIG. 1a, a typical prior art HUD/HDD system, designated generally with the reference numeral 10, is shown including a CRT 12, a vertical linear polarizer 14, a LCD 16, beam splitter 18, horizontal linear polarizer 20, vertical linear polarizer 22, and combiner 24. CRT 12 produces an image which is given a vertical polarization by vertical linear polarizer 14. The image is then incident upon LCD 16. LCD 16 is a controllable bire-fringent device (or, more commonly, a liquid crystal shutter—hereinafter "controllable LCD") that can be placed in one of two states, depending upon a control voltage level applied. Applying a low voltage to the controllable LCD 16 rotates the plane of polarization of transmitted light by 90°; applying a higher voltage place the controllable LCD 16 in a state that permits it to transmit light with no change in polarization. Since a vertical linear polarizer can substantially block horizontally polarized light (and vice-versa), by selectively arranging horizontal and/or vertical linear polarizers in the image path, the image may be selectively transmitted or blocked in an HUD or HDD path by controlling the linear polarization of the image transmitted by the controllable LCD 16. Thus, if the image passed by the controllable LCD 16 is vertically polarized, that portion of the image passed by the beam splitter 18 will be blocked by the horizontal polarizer 20 while the reflected (by beam splitter 18) portion will be passed by the vertical linear polarizer 22 to the combiner 24 for viewing. Conversely, electrically switching the controllable LCD 16 to a high voltage state changes the vertically linear polarized image to a horizontally linear polarized image that is blocked by the vertical linear polarizer 22, and passed (for viewing) by the horizontal linear polarizer 20. An example of such an arrangement is summarized in FIG. 1b, corresponding to the embodiment shown in FIG. 1a.

Not shown in FIG. 1a for reasons of clarity, but evident to those skilled in this art, is the timing and control circuitry, and corrections to certain of the elements, for controlling generating of the HUD and HDD images, for controlling the controllable LCD 16, and for synchronizing that generation and control as appropriate.

Such prior art systems are subject to light leakage through the polarizers. That is, for example, horizontal linear polarizer 20 does not fully block the HDD path in the HUD mode, nor does vertical linear polarizer 22 fully block the HUD path in the HDD mode. Therefore, it is common in the prior art to "stack" polarizers to reduce light leakage. The common method is referred to as "double-extinguishing," and the more effective implementations of this method use at least three polarizers in the HUD or HDD image path.

Although light leakage is reduced, with some increase in the contrast of the image as against any background passing through combiner 24, there is a significant degredation in light transmission. Consider: If the polarizers are chosen to have a normal transmission of 38% then the maximum light transmission of the system would be in the neighborhood of 5.5%. Increasing the number of polarizers decreases the light leakage but correspondingly decreases transmission of the system.

The present invention overcomes the low contrast/transmission problems inherent in prior art single-source HUD/HDD systems. As discussed below, the present invention finds application in both monochrome and color systems.

SUMMARY OF THE INVENTION

The present invention is directed to a combined head-up, head-down display (HUD/HDD) system incorporating cholesteric liquid crystal elements which, together with associated LCDs, act as an image shutter apparatus to selectively transmit or block portions of an image to an observer. The HUD/HDD system of the present invention provides a high transmissivity of images, together with a high contrast ratio of those images against background images not heretofore obtained.

According to a preferred embodiment of the present invention, an image source (e.g., cathode ray tube) forms images with a spectral content in a bandwidth around one or more selected primary wavelengths. The image is projected onto a beam splitter via a selective circular polarizer that includes a cholesteric element sensitive to the spectral content of the projected image and a controllable liquid crystal element. The beam splitter projects the image onto two separate paths—one for HUD display, the other for HDD display, the image in each path having a circular polarization different from that of the other path (i.e., right-hand or left-hand circular polarization). Cholesteric elements in each path operate to block or pass the image to its final destination, depending on its (the image's) circular polarization.

Thus, when the HUD image is presented by the image source, the circular polarizer transmits a version of the image with a circular polarization that projects the image to the observer via the HUD path. Conversely, when the HDD image is presented, the circular polarizer transmits an image version having a circular polarization that projects the image along the HDD path to the observer.

In an alternate embodiment of this invention, the concepts are extended to a system in which information is colored, the images for each of the colors being routed in the manner explained above, through paths containing light filters that provide the desired color.

The HUD/HDD system according to the present invention will now be described in further detail with reference to the following detailed description, figures, and tables.

BRIEF DESCRIPTION OF THE DRAWINGS

FIG. 1a illustrates a prior art HUD/HDD system utilizing vertical and horizontal polarizers;

FIG. 1b summarizes the operation of the prior art apparatus shown in FIG. 1a;

FIG. 2a illustrates one embodiment of the the present invention capable of providing HUD/HDD display for a monochrome image;

FIG. 2b summarizes the operation of the apparatus shown in FIG. 2a according to one aspect of the present invention;

FIG. 3a illustrates another embodiment of the the present invention capable of providing HUD/HDD projection of a multi-color image;

FIG. 3b summarizes the operation of the apparatus shown in FIG. 3a according to another aspect of the present invention; and FIGS. 4a and 4b illustrate the transmission and polarization characteristics and efficiency of a cholesteric liquid crystal element reflective to RHCP green light.

DETAILED DESCRIPTION OF THE PREFERRED EMBODIMENT

The present invention takes advantage of certain properties exhibited by cholesteric liquid crystal elements with regard to light incident upon them. These properties are explained with reference to FIGS. 4a and 4b. A cholesteric liquid crystal element (or cholesteric element) is substantially transparent to all wave-lengths of electromagnetic radiation, specifically visible light, except that within a narrow bandwidth B around a selected primary wavelength, for example 540 Nm (i.e., green light), as shown in FIG. 4a. Within bandwidth B light of one rotary sense incident upon the cholesteric element from either direction is reflected by the cholesteric element. By convention, a cholesteric element which is reflective to right-hand circular polarized ("RHCP") light is said to be a right-hand cholesteric element. Conversely, a cholesteric liquid crystal element which is reflective to left-hand circular polarized ("LHCP") light is said to be a left-hand cholesteric element. A more complete description may be found in Adams, et al., CHOLESTERIC FILMS AS OPTICAL FILTERS, *Journal of Applied Physics*, Vol. 42, No. 10 (1971).

Another salient feature of cholesteric liquid crystal elements is that the rotary sense of an image transmitted by the cholesteric element is maintained. That is, if light of a first rotary sense, say RHCP, passes through a cholesteric element, the light maintains that first rotary sense, i.e., remains RHCP.

As FIG. 4b illustrates, cholesteric elements have very high transmissivity of light outside of bandwidth B. The cholesteric element is capable of achieving transmission of up to 90% for all light except that of one rotary sense within bandwidth B, for which light the element is capable of greater than 90% reflection.

Turning now to FIG. 2a, an implementation of the present invention in a HUD/HDD system, designated generally by the reference numeral 50 is illustrated. As shown, system 50 includes an image source 52 to produce HUD and HDD images by writing the HUD and HDD information, alternating rapidly between the two types (HUD and HDD) of information. The alternating is at a rate above the flicker-fusion frequency so that it appears to an observer that both HUD and HDD information is being generated simultaneously. The image source 52 is configured so that the image generated will be unpolarized and within a bandwidth B around a primary wavelength, for example 540 Nm (i.e., green light). The unpolarized image emitted from image source 52 is projected to a cholesteric element 54 which is constructed to be a right-handed cholesteric element active in bandwidth B around 540 Nm. This construction of the cholesteric element 54 causes it to impart left-hand circular polarization to the image from image source 52 by reflecting (or filtering out) the RHCP green light emitted, and passing onto a controllable LCD 56 a LHCP image. The controllable LCD 56 is configured so that when a voltage of one level is applied thereto (e.g., by timing and control device 98), the controllable LCD 56 will transmit the image unattenuated. If another voltage level is applied to the controllable LCD 56, the transmitted image will be converted to RHCP.

Assume the controllable LCD is in a state that passes the image unaffected. The LHCP image is passed to a beam splitter 58 where it is divided into two paths, a reflected path R, in FIG. 2a being the HUD path, and a transmitted path T, in FIG. 2a being the HDD path. As a general rule, when circularly polarized light is reflected by a reflecting body, such as beam splitter 58, the circular polarization of the light is reversed. Thus, the LHCP image is reflected by the beam splitter 58 into the HUD path (R) as a RHCP light image. The RHCP image is then incident upon a right-handed cholesteric element 62 which substantially reflects the image, blocking transmission of the image to a HUD combiner 64. That portion of the LHCP image passing through beam splitter 58 to follow the HDD path (T) does so without alteration of its rotary sense. The unaltered LHCP image continues on to a right-handed cholesteric element 60 where, due to the fact of its (the image's) LHCP property, it passes unattenuated through right-handed cholesteric element 60 to the observer, indicated by an eye labeled O, in FIG. 2a.

Reconfiguring the HUD/HDD system 50 to its HUD configuration, merely requires the timing and control element 98 to apply a voltage to the LCD 56 putting into a state that allows the LHCP image generated by the image source 50 and transmitted by cholesteric element 54 to undergo a conversion to RHCP. Thus, the image incident on beam splitter 58 is RHCP. As before, the image reflected by beam splitter 58 undergoes a conversion of circular polarization, from RHCP to LHCP. The reflected LHCP image (R) is incident upon right-hand cholesteric element 62 which transmits the image to combiner 64, of a type well-known in the art. The combiner then presents the observer O with an image of the HUD information superimposed on a background of external images or the like. In the HDD path the RHCP image passes unattenuated through beam splitter 58 to right-hand cholesteric element 60. The RHCP image is fully reflected by right-hand cholesteric element 60, effectively blocking the HDD path.

It may be desirable to include a one-quarter lamda plate (one-quarter wavelength retarder) 66 between right-handed cholesteric element 62 and combiner 64 to convert the left-hand circular polarized light into linear polarized light. This may be necessary inasmuch as some combiners require a specific linear polarization to effectively reflect incident light.

Preferably, the beam splitter 58 is implemented by using a half-silvered mirror of conventional construction. Although other devices can be used to divide the beam into two or more paths, such as a polarizing cube, the simplicity of a half-silvered mirror makes it preferable.

Since the optics of the system according to the present invention contain no conventional polarizers, which reduce greatly brightness (as opposed to cholesteric films, for example), the image produced by the system is much brighter than prior art systems. The contrast ratio remains very high because the reflection/transmission efficiency of the cholesteric elements to circularly polarized monochromatic light is very high. This is especially true when the angle of incidence is close to 90°, controlled by physical design constraints.

Although the previously described embodiment is with regard to monochromatic images, the system is equally applicable to multi-color images, as shown in FIG. 3a and FIG. 3b. A multi-color HUD/HDD system, designated generally with the reference numeral 68, is shown in FIG. 3a as comprising a multi-color image source 70, such as a CRT having red and green phosphor coatings which, as previously described, generate HUD and HDD information discreetly and above the flicker-fusion frequency. System 68 incorporates a plurality of cholesteric elements 72, 74, 80, 84, 88, and 92 in the various images paths. Certain of the cholesteric elements 72, 74, 80, 84, 88, and 92 will be referred to by convention as red cholesteric elements, or green cholesteric elements, denoting the primary wavelength of reflection of the cholesteric elements. The cholesteric element 72 is configured as a left-hand red cholesteric, meaning that it will reflect the red LHCP component of the image, passing the red RHCP (thereby circularly polarizing the image's red component), along with the green component of the image. The cholesteric 74 is a green left-hand cholesteric, operating to circularly polarize the green component of the image. The left-hand cholesteric elements 72 and 74 form the primary image path (P).

A beam splitter 76, comprising preferably a half-silvered mirror, projects the image provided by the primary image path P along two secondary paths: A reflected path (R) for HUD viewing, and a transmitted path (T) for HDD viewing.

In the transmitted path T are controllable LCD elements 78 and 82, together with left-hand red and green cholesteric elements 80 and 84. In the reflected path R are two more controllable LCDs 86 and 90, and two left-hand cholesterics 88 and 92—red and green, respectively, which communicate the image to a HUD combiner 94. System 68 further includes and timing device 98.

In operation, the states of system 68 can be divided into four categories, HDD red, HDD green, HUD red, and HUD green, each corresponding to the color and path of a transmitted image. Each state of system 68 begins with the following. The image to be viewed by observer O is written onto CRT 70. The image from CRT 70 comprises both red and green elements. Left-hand red cholesteric element 72 filters out of the image the LHCP red component, passing the RHCP red component and and RHCP and LHCP green components to left-hand green cholesteric element 74. The LHCP green element is filtered out of the image by left-hand green cholesteric element 74 which transmits the image now comprising an RHCP red component and an RHCP green component to beam splitter 76. Beam splitter 76 serves to divide the image into two paths: a reflected path R, in FIG. 3a corresponding to the HUD path, and a transmitted path T. in FIG. 3a corresponding to the HDD path.

The HDD red state of system 68 is implemented as follows. The image is passed unattenuated through beam splitter 76 in the HDD path to LCD 78, LCD 78 (as well as LCD 82, LCD 86, and LCD 90) is of the two-state type described above. LCD 78 is placed in the high voltage state so that the rotary sense of the image it transmits is left unchanged. Thus, an image is presented to left-hand red cholesteric element 80 comprising the RHCP red and RHCP green component. Consequently, left-hand red cholesteric element 80 passes the image unattenuated to LCD 82, which is placed in the low voltage state. The image is thereby converted so that it now comprises LHCP red and LHCP green components. The image is filtered by left-hand green cholesteric element 84, which removes the LHCP green components, transmitting only the LHCP red component to observer O.

In the HUD path, the image is reflected by the beam splitter 76, thereby reversing the rotary sense of the image, thereby projecting an image comprising LHCP red and LHCP green components onto LCD 86. LCD 86 is placed in the high-voltage state by the timing and and control unit 98, permitting the image to be transmitted through the LCD without modification of its rotary sense. A left-hand red cholesteric element 88 filters the LHCP red component of the image, transmitting only the left-hand circular polarized green component of the image to LCD 90, LCD 90 is placed in the high voltage state by the timing and control unit 98 so that it transmits the image unattenuated to left-hand green cholesteric element 92, which filters the LHCP green element, effectively blocking the HUD path.

Where a green image is to be projected in the HDD path, LCD 78 is placed in the low voltage state, LCD 82 is placed in the low voltage state, LCD 86 is given the high voltage state, and LCD 90 is placed in the high voltage state.

Another way of looking at the present invention is to note the combination of a controllable LCD and left-hand cholesteric element in each secondary path (R and T) for each color. The combinations operate together as controllable shutters to block or transmit those color components of the image. Thus, for example, to communicate a red image to the HUD viewer, the "shutter" formed by controllable LCD 78/left-hand red cholesteric element 80 combination closes, while the HUD "shutter" (the controllable LCD 86/left-hand red cholesteric element 88) is opened to pass the red component of the image.

Similar to the description with reference to FIG. 2a, it may be desirable to include a one-quarter lamda plate (one-quarter wavelength retarder) 96 between left-hand green cholesteric element 92 and combiner 94 as some combiners require a specific linear polarization to effectively reflect incident light.

Implementation of the present invention will, as evident to those skilled in this art, involve coordination of the generation of images written on image sources 52 or 70 with the states assumed by certain LCDs in the described embodiments. This timing may be implemented by any of a wide variety of prior art timing devices, the particulars of which are not crucial to practicing the present invention. Therefore such a timing device 98 is shown in block form in Figs 2a and 3a, and is not described or discussed in detail.

Additionally, the image source 70 may be of the type in which the red and green phosphors are mixed. This type of image source can produce extraneous colors (e.g., blue). In this case, if such extraneous colors are produced and found objectionable, a filter may be placed between the image source 70 and cholesteric element 72 to filter the unwanted color.

It is readily apparent that a three-color HUD/HDD system according to the principles of the present invention would require only additions to the systems described above. Basically, the additions would be a cholesteric element and controllable LCD pair in each of the secondary (HUD and HDD) paths, and a cholesteric element sensitive to the color in the primary path.

Those skilled in the art to which this invention relates will recognize that many changes in construction and widely differing embodiments and applications of the present invention will suggest themselves without departing from its spirit and scope. For example, the composition of the cholesteric liquid crystal elements may be such that the bandwidth of maximum reflection may be varied. Further, the bandwidth of maximum reflection may be around wave lengths other than the red and/or green wave lengths. Additionally, it is quite possible to orient the elements differently, with consequently different states for the LCDs. Many such configurations are possible and workable. This same statement is true for the selections of right- or left-handedness of the cholesteric liquid films. The selections of handedness and bandwidth of the cholesteric elements, and consequent truth tables for the LCDs are illustrative of a preferred embodiment, and disclosures and descriptions as well as the general disclosures and descriptions herein are purely illustrative and are not intended to be in any sense limiting.

What is claimed is:

1. An apparatus for directing a plurality of images from an image source, which generates a first and a second image having a first and a second wavelength, along a first and a second optical path, comprising:
    means for converting incident radiation of the first wavelength to a first polarization;
    means for converting incident radiation of the second wavelength to a second polarization;
    a beam splitter, disposed along the first and second optical paths, for transmitting a first portion of said converted incident radiation along said first optical path and reflecting a second portion of said converted radiation along said second optical path, said transmitted first portion has radiation of said first wavelength polarized in said first polarization and said second wavelength polarized in said second polarization,
    said reflected second portion has radiation of said first wavelength polarized in a third polarization, orthogonal to said first polarization, and said second wavelength polarized in a fourth polarization, orthogonal to said second polarization;
    a first shutter means, disposed along said first optical path and responsive to a first filter signal, for reflecting said first wavelength and passing said second wavelength of said transmitted first portion of said converted radiation;
    a second shutter means, disposed along said first optical path and responsive to a second filter signal, for reflecting said second wavelength and passing said first wavelength of said transmitted first portion;
    a third shutter means, disposed along said second optical path and responsive to a third filter signal, for reflecting said first wavelength and passing said second wavelength of said reflected second portion of said converted radiation;
    a fourth shutter means, disposed along said second optical path and responsive to a fourth filter signal, for reflecting said second wavelength and passing said first wavelength of said reflected second portion; and
    a timing device for providing said first, second, third and fourth filter signals to selectively pass desired images of said first and second wavelength along said first and second optical paths.

2. An apparatus for directing a plurality of images from an image source, which generates a first and a second image having a first and a second wavelength, along a first and a second optical path, comprising:
    a first and a second cholesteric element respectively having a primary wavelength at the first and second wavelength wherein incident radiation from the first and second images is particularly circularly polarized in a predetermined handedness, said first and second cholesteric elements disposed along the first and second optical paths;
    a beam splitter, disposed at a junction of said first and second optical paths, for transmitting a first portion of said particularly polarized radiation along said first optical path and for reflecting a second portion of said particularly polarized radiation having an orthogonal polarization along said second optical path;
    a first and a second cholesteric means, disposed along said first optical path and responsive to an assertion of a respective filter signal, for changing said particular circular polarization to said orthogonal polarization, said first cholesteric changing means operative on said first wavelength and said second cholesteric changing means operative on said second wavelength;
    a first cholesteric filter, disposed along said first optical path, for reflecting incident radiation of said first wavelength having said orthogonal polarization;
    a second cholesteric filter, disposed along said first optical path, for reflecting incident radiation of said second wavelength having said orthogonal polarization;
    a third and a fourth cholesteric means, disposed along said second optical path and responsive to an assertion of a respective filter signal, for changing said orthogonal polarization to said particular polarization, said third cholesteric changing means operative on said first wavelength and said fourth cholesteric changing means operative on said second wavelength;
    a third cholesteric filter, disposed along said second optical path, for reflecting incident radiation of said first wavelength having said orthogonal polarization;
    a fourth cholesteric filter, disposed along said second optical path, for reflecting incident radiation of said second wavelength having said orthogonal polarization; and a timing device, coupled to said cholesteric changing means and to the image source, for independently providing said filter signals to said first, second, third and fourth cholesteric changing means which permits any combination of the first and second images to be received at an end of either optical path.

3. An apparatus for directing a plurality of images from an image source, which generates a first and a second image having a first and a second wavelength, along a first and a second optical path, comprising:

means for converting incident radiation of the first wavelength to a first polarization;

means for converting incident radiation of the second wavelength to a second polarization;

a beam splitter, disposed along the first and second optical paths, for transmitting a first portion of said converted incident radiation along said first optical path and reflecting a second portion of said converted radiation along said second optical path, said transmitted first portion has radiation of said first wavelength polarized in said first polarization and said second wavelength polarized in said second polarization, said reflected second portion has radiation of said first wavelength polarized in a third polarization, and said second wavelength polarized in a fourth polarization;

a first shutter means, disposed along said first optical path and responsive to a first filter signal, for reflecting said first wavelength and passing said second wavelength of said transmitted first portion of said converted radiation;

a second shutter means, disposed along said first optical path and responsive to a second filter signal, for reflecting said second wavelength and passing said first wavelength of said transmitted first portion;

a third shutter means, disposed along said second optical path and responsive to a third filter signal, for reflecting said first wavelength and passing said second wavelength of said reflected second portion of said converted radiation;

a fourth shutter means, disposed along said second optical path and responsive to a fourth filter signal, for reflecting said second wavelength and passing said first wavelength of said reflected second portion; and a timing device for providing said first, second, third and fourth filter signals to selectively pass desired images of said first and second wavelength along said first and second optical paths.

4. Apparatus for forming at least first and second images to be respectively viewed at first and second viewing positions, the apparatus comprising:

imaging means for alternately producing the first and second images;

polarizing means for selectively providing the first and second images with a first and a second circular polarization, respectively;

means for directing the first and second images onto at least first and second paths, the directing means including means for reversing the circular polarization of the first and second images directed onto the first path;

filter mans positioned in each of the first and second paths to reflect images having the first circular polarization and to transmit, substantially unattenuated, images having the second circular polarization on to the first and second viewing positions.

5. The apparatus of claim 4, wherein the imaging means includes means for forming the first and second images in a bandwidth around a predetermined primary wavelength.

6. The apparatus of claim 5, wherein the polarizing means comprises a first cholesteric means for imparting the first and second images with the first circular polarization.

7. The apparatus of claim 6, wherein the polarizing means includes a means, operable in synchronism with the imaging means, for converting the first circular polarization of the second images to the second circular polarization, and transmitting the first images unchanged.

8. The apparatus of claim 7, wherein the filter means includes second cholesteric liquid crystal means reflective to images within a bandwidth having the second circular polarization.

9. The apparatus of claim 8, wherein the directing means includes mirror means operable to reflect the first and second images onto the first path, and to transmit the first and second image onto the second path.

10. The apparatus of claim 4, wherein the polarizing means, and each of the filter means includes a cholesteric liquid crystal means reflective to images within a bandwidth having the second circular polarization.

11. The apparatus of claim 10, wherein the polarizing means includes a liquid crystal means operable in synchronism with the imaging means, for converting the first circular polarization of the second images to a second circular polarization, and transmitting the first images unchanged.

12. The apparatus of claim 4, including additional filter means positioned in association with the polarizing means to reflect images from the imaging means having the first circular polarization and to transmit, substantially unattenuated, images having the second circular polarization.

13. The apparatus of claim 12, wherein the polarizing means includes controllable liquid crystal means operable in a first mode to receive and transmit, substantially unchanged, images from the filter means, and in a second mode to transmit received images having the first circular polarization as images having the second circular polarization.

14. The apparatus of claim 13, including control means coupled to the controllable liquid crystal means and operable in synchronism with the imaging means to alternately place the controllable liquid crystal means in the first and the second mode as the imaging means produces the first and second images, respectively.

15. Apparatus for communicating at least first and second images to corresponding first and second viewing positions, the apparatus comprising:

imaging means for alternately producing the first and second images;

first cholesteric crystal means reflective to images within a bandwidth having a second circular polarization for transmitting the first and second images with a first circular polarization;

liquid crystal means operable in synchronism with the imaging means, for converting the circular polarization of the second images to the second circular polarization, and transmitting the first images unchanged;

means for directing the first and second images onto at least first and second paths, the directing means including means for converting images directed onto the first path having first or second circular polarizations to second or first circular polarizations, respectively;

second and third cholesteric means reflective to images with the bandwidth having the second circular polarization, positioned in each of the first and second paths to reflect images having the first circular polarization and to transmit, substantially unattenuated, images having the second circular polarization on to the first and second viewing positions, respectively.

16. The apparatus of claim 15, wherein the first and second circular polarizations are left and right hand circular polarizations, respectively.

17. The apparatus of claim 15, wherein the imaging means produces the first and second images in an alternating frequency that is substantially flicker-free to a viewer at the first or the second viewing position.

* * * * *

UNITED STATES PATENT AND TRADEMARK OFFICE
CERTIFICATE OF CORRECTION

PATENT NO. : 4,987,410
DATED : Jan. 22, 1991
INVENTOR(S) : Arthur L. Berman and Thomas M. Lewis It is certified that error appears in the above-identified patent and that said Letters Patent is hereby corrected as shown below:

ON TITLE PAGE:

In item [54], change the Title from "MULTIPLE IMAGE FORMING APPARATUS" to --MONOCHROMATIC AND MULTICOLORED HEAD-UP/HEAD-DOWN DISPLAY SYSTEM--;

In column 2, line 24, delete "contrast/-" and substitute therefor, --contrast/--;

In column 4, line 46, delete "configuration, merely" and substitute therefor, --configuration merely--;

In column 5, line 55, delete "includes and timing" and substitute therefor, --includes timing--;

In column 6, line 6, delete "T." and substitute therefor, --T,--; and

In column 9, line 66, delete "mans" and substitute therefor, --means--.

Signed and Sealed this

Twenty-third Day of June, 1992

Attest:

DOUGLAS B. COMER

*Attesting Officer*    *Acting Commissioner of Patents and Trademarks*